United States Patent
Spaiches

[15] 3,694,985
[45] Oct. 3, 1972

[54] WINDOW GLASS GLAZING SYSTEM
[72] Inventor: Albert E. Spaiches, Webster, N.Y. 14580
[73] Assignee: Schlegel Manufacturing Company, Rochester, N.Y.
[22] Filed: Oct. 23, 1970
[21] Appl. No.: 82,934

[52] U.S. Cl. .................52/400, 49/488, 52/403, 52/498
[51] Int. Cl. .............................................E04b 1/62
[58] Field of Search........52/397, 398, 399, 400, 403, 52/204, 213, 216, 208, 498, 502; 49/485, 488

[56] References Cited

UNITED STATES PATENTS

| | | | |
|---|---|---|---|
| 3,072,229 | 1/1963 | Pasche et al. | 49/485 X |
| 2,548,556 | 4/1951 | Ogren | 52/400 |
| 3,090,083 | 5/1963 | Emmerich | 52/400 X |
| 3,442,059 | 5/1969 | Kessler | 52/399 |
| 3,468,064 | 9/1969 | Fraleigh | 49/488 X |

FOREIGN PATENTS OR APPLICATIONS

| | | | |
|---|---|---|---|
| 249,058 | 1/1964 | Australia | 52/400 |
| 642,634 | 9/1950 | Great Britain | 52/397 |
| 706,698 | 5/1966 | Italy | 52/502 |

*Primary Examiner*—Alfred C. Perham
*Attorney*—Cumpston, Shaw & Stephens

[57] ABSTRACT

A channel-shaped retainer strip is secured to the edge of a window glass to retain the glass in a plastic frame and form a seal between the glass and the frame. The bodies of the frame and the retainer strip are formed of relatively strong and hard plastic, and the retainer strip has relatively soft plastic seal fins engaging the outside of the glass and the frame to seal the glass in the frame. Confronting surfaces between the frame and the retainer strip are formed with interlocking projections of soft plastic material that allow the glass to be pressed into the frame and resist movement of the glass back out of the frame to retain the glass in place.

8 Claims, 6 Drawing Figures

PATENTED OCT 3 1972 3,694,985

INVENTOR.
ALBERT E. SPAICHES

BY Cumpston, Shaw
  - Stephens

ATTORNEYS

WINDOW GLASS GLAZING SYSTEM

THE INVENTIVE IMPROVEMENT

The traditional glazing of a window glass in a frame has become increasingly expensive and wasteful, and the invention aims at an improved glazing system that performs better and is more economical. The invention involves analysis of the requirements for a window glass glazing system, and devising an improved construction meeting such requirements in a more economical manner.

SUMMARY OF THE INVENTION

The inventive window glass glazing system uses extruded plastic parts to form a window frame and a channel-shaped retainer strip secured astraddle the edge of the glass to hold the glass in the frame and form a seal between the glass and the frame. The main bodies of the frame and retainer strip are formed of relatively strong and hard plastic material, and the retainer strip has a glass seal fin and a frame seal fin formed of relatively soft and resilient plastic material and arranged respectively to press against the outside of the glass and the window frame to form a seal between the glass and the frame. The confronting surfaces of the retainer strip and the frame are configured to allow the glass to be pressed into the frame on one side and be retained in the frame by projections that are oriented to interlock to resist movement of the glass back out of the frame. Such projections are formed of relatively soft and resilient plastic material for greater frictional and gripping force.

DRAWINGS

DETAILED DESCRIPTION

Figure 2:
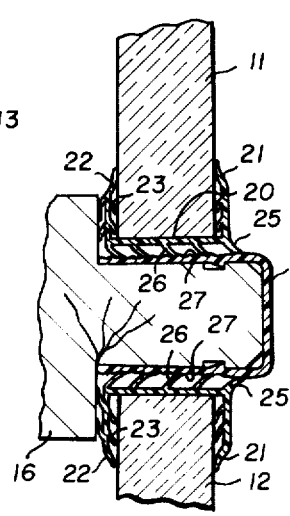
FIG. 2 is a fragmentary cross-sectional view of the window of FIG. 1 taken along the line 2 — 2 thereof.
Figure 3:
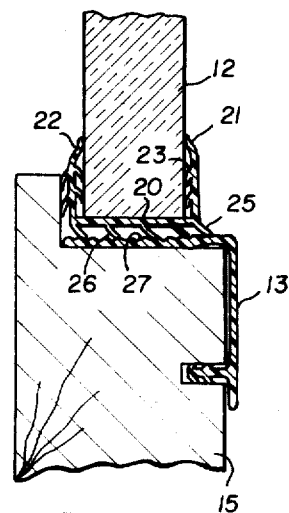
FIG. 3 is a fragmentary cross-sectional view of the window of FIG. 1 taken along the line 3 — 3 thereof.

Window 10 is formed with two pieces of window glass 11 and 12 held in a frame 13 that includes a mullion 14 between glass pieces 11 and 12. The glazing of window 10 is best shown in FIGS. 2 and 3.

Outer frame 13 and mullion frame 14 are plastic extrusions secured respectively to wood or metal supports 15 and 16 constructed around window 10. The main bodies of extrusion 13 and 14 are formed of relatively hard and strong plastic material for strength and wear resistance, and bodies 13 and 14 are secured to supports 15 and 16 preferably with simple, snap-on interlocks such as illustrated.

Retainer strips 20 are also formed of extruded plastic material and have a generally channel-shape for straddling the edges of glass pieces 11 and 12. The main body of retainer strip 20 is also formed of a relatively hard and strong plastic material for strength and wear in fitting securely over glass pieces 11 and 12. Retainer strips 20 cooperate with frame pieces 13 and 14 to retain glass pieces 11 and 12 securely in place, and to form a seal between glass pieces 11 and 12 and frame pieces 13 and 14.

The channel edges of retainer strip 20 have fins 21 and 22 formed integrally with retainer strip 20 in a single extrusion, and made of relatively soft and resilient plastic material. Fins 21 and 22 are oriented to press tightly against glass pieces 11 and 12 to seal retainer strips 20 to glass pieces 11 and 12. Internal fins 23 inside the channel portion of retainer strips 20 are angled to engage the surfaces of glass pieces 11 and 12 in a bracing orientation providing a strong frictional resistance to the removal of retainer strip 20 from glass pieces 11 and 12. Fins 23 are also preferably formed of soft and resilient plastic material for easier compliance and greater frictional grip. Fins 23 can be omitted if glass pieces 11 and 12 and retainer strips 20 are made accurately enough for a tight, press-on fit of retainer strips 20 over the edges of glass pieces 11 and 12.

A frame seal fin 25 of soft and resilient plastic material is formed along the outer edge of retainer strip 20 to press against frame pieces 13 and 14 to seal retainer strip 20 to the frame of window 10.

Gripping fins 26, also made of relatively soft and resiliently plastic material, are formed along the edge of retainer strip 20 as frame members 13 and 14. The inward facing surfaces of frame pieces 13 and 14 have serrations 27 shaped as small ridges and also formed of relatively soft and resilient plastic material. Oblique gripping fins 26 then catch and brace in serrations 27 to resist motion of glass pieces 11 and 12 toward the outside of the window frame. At the same time, the combination of soft serrations 27 and soft fins 26 allows glass pieces 11 and 12 to be pressed into the window frame from the outside. When glass pieces 11 and 12 are seated in the frame as illustrated, the soft, resilient plastic material of fins 26 and serrations 27 form a strong, interlocking, frictional grip that holds glass pieces 11 and 12 securely in place, and sealing fins 21 and 25 seal the outside of window 10.

The inward facing serrated surfaces of frame piece 14 are preferably tapered slightly to converge toward the inside of the window frame so that the outside edge opening of the window frame is slightly smaller than the inside edge opening. This enhances the bracing and gripping action of fins 26 to resist outward motion of glass pieces 11 and 12.

Figure 1:
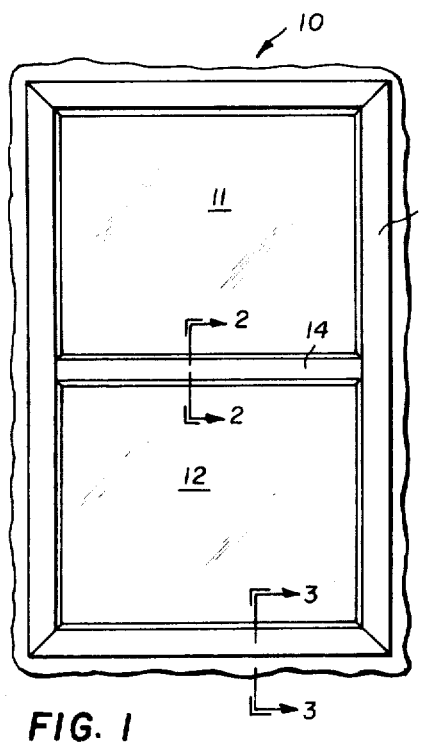
FIG. 1 is an elevational view of a window glazed with the inventive system.

To form, assemble, and glaze window 10 of FIGS. 1 – 3, it is merely necessary to extrude the illustrated strips, cut, miter and snap in place the frame pieces 13 and 14, miter and fit retainer strips 20 around glass pieces 11 and 12, and press glass pieces 11 and 12 into place inside frame members 13 and 14. Mitered corners can be fused or bonded. Fins 21 and 25 form an effective seal around window 10 and the grip between retainer strips 20 and frame pieces 13 and 14 and holds the window glass securely in place. If a window glass is broken, the pieces are pulled out and a new glass rimmed with retainer strip 20 is merely pressed into place to complete the repair.

Figures 4, 5:
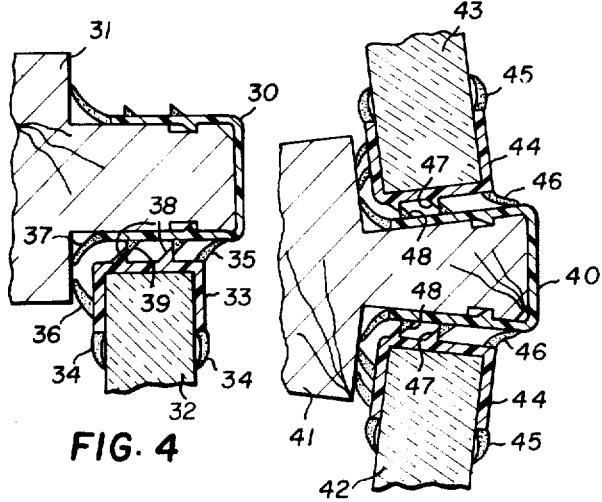
FIGS. 4 – 6 are fragmentary cross-sectional views of alternative arrangements of the inventive system.
Figure 6:
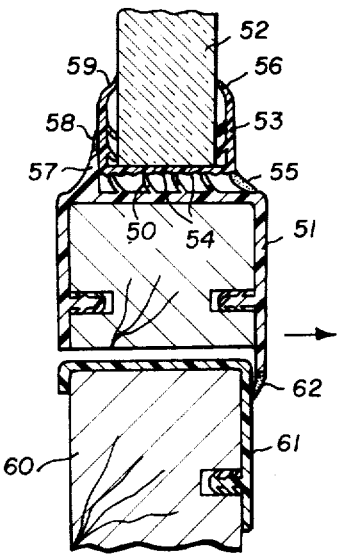

FIGS. 4 – 6 show alternative preferred embodiments of the inventive glazing system. Frame piece 30 is fastened onto structure 31, and window glass 32 has a retainer strip 33 as shown in FIG. 4. The bodies of frame piece 30 and retainer strip 33 are formed of hard plastic material and retainer strip 33 has soft fins 34 pressing against glass 32 to form a seal. Retainer strip 33 also has a frame seal fin 35 pressing against frame piece 30 to form a seal between frame 30 and retainer strip 33. Soft, sealing fins 36 and 37 seal retainer strip 33 and frame piece 30 respectively to structure 31.

Instead of gripping fins and serrations, the confronting surfaces of retainer strip 33 and frame piece 30 are formed with interlocking projections 38 and 39 that allow glass piece 32 to be pressed into frame 30 and then interlocked to prevent motion of glass piece 32 outward from frame 30. Projections 38 on retainer strip 33 are formed of hard plastic material, and projections 39 on frame piece 30 are formed of soft and resilient plastic material. This allows projections 38 to move over projections 39 and then interlock as illustrated. The same effect can be achieved by making projections 39 hard and projections 38 soft, or both projections 38 and 39 can be soft.

The embodiment of FIG. 5 is similar to the embodiment of FIG. 4 except that frame piece 40 is angled to fit over structure 41 which is formed to provide an angle between glass pieces 42 and 43 as illustrated. Retainer strips 44 have soft, glass seal fins 45 and frame seal fins 46 and have projections 47 that interlock with frame projections 48 to hold glass pieces 42 and 43 in place after they are pressed inside frame 40.

The embodiment of FIG. 6 is similar to the embodiment of FIG. 3 except that soft, gripping fins 50 are formed on frame piece 51 to extend obliquely toward window glass 52, and retainer strip 53 has soft serrations or ridges 54 facing fins 50 to provide an interlocking grip preventing outward movement of window glass 52. A frame seal fin 55 on retainer strip 53 forms a seal with frame piece 51, and a glass seal fin 56 seals retainer strip 53 to glass 52. An abutment 57 near the inside of frame piece 51 provides an inward stop for glass 52, and a soft, fin 58 extends from abutment 57 to form a seal by pressing against retainer strip 53. An inside glass sealing fin 59 seals retainer strip 53 to glass 52.

Frame piece 51 is movable in the direction of the arrow for opening the window, and a fixed jamb piece 61 is secured to a fixed structure 60 adjacent frame 51. A soft plastic fin 62 extends from frame 51 to press against jamb 61 to form a seal when the window is closed.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate how the invention can be adapted to many styles and structures of windows, and they will be able to apply the inventive system widely to supplant previous window glass glazing systems.

I claim:
1. A window glass glazing system comprising:
  a. a support construction built in place around an opening for said window glass;
  b. a frame liner surrounding said glass and having a surface facing inward around said glass;
  c. means for attaching said frame liner to said construction;
  d. said frame liner being shaped to form a surface covering applied over said construction;
  e. a channel-shaped retainer strip secured astraddle the edge of said glass to hold said glass in said frame liner and form a seal between said glass and said frame liner;
  f. the bodies of said frame liner and said retainer strip being formed of relatively strong and hard plastic material;
  g. said retainer strip having a glass seal fin formed of relatively soft and resilient plastic material and oriented to press against the out-side of said glass;
  h. the outside edge of said retainer strip having a frame seal fin formed of relatively soft and resilient plastic material and oriented to press against said frame liner;
  i. said retainer strip having a surface confronting said inward facing surface of said frame liner;
  j. said confronting surfaces of said retainer strip and said frame liner being configured to allow said glass to be pressed into said frame liner from one side thereof;
  k. said confronting surfaces having projections oriented to interlock to resist movement of said glass toward said one side of said frame liner; and
  l. said projections being formed of relatively soft and resiliently plastic material

2. The system of claim 1 wherein said projections comprise serrations on one of said bodies and oblique fins on the other of said bodies.

3. The system of claim 2 wherein said serrations and said fins are each formed of said relatively soft and resilient plastic material.

4. The system of claim 3 wherein said serrations are on said frame liner and said fins are on said retainer strip.

5. The system of claim 1 wherein said inward facing surface of said frame liner is angled to have a smaller dimension along said one side.

6. The system of claim 1 wherein said one side of said frame liner is the outside thereof.

7. The system of claim 1 wherein said construction is movable for opening said window, and said frame liner has a fin of relatively soft and resilient material disposed for pressing against a fixed structure to form a seal when said frame liner closes against said fixed structure.

8. The system of claim 1 wherein said frame liner attaching means comprises means for snap-fitting said frame liner to said construction.

* * * * *